United States Patent
Galizzi et al.

(10) Patent No.: US 11,167,741 B2
(45) Date of Patent: Nov. 9, 2021

(54) SYSTEM FOR MONITORING A BRAKE DISC OF A BRAKING SYSTEM OF A VEHICLE

(71) Applicant: FRENI BREMBO S.P.A., Bergamo (IT)

(72) Inventors: Valerio Galizzi, Curno (IT); Benjamin Szewczyk, Curno (IT); Stefano Melzi, Milan (IT); Egidio Di Gialleonardo, Milan (IT); Ferruccio Resta, Milan (IT)

(73) Assignee: Freni Brembo S.p.A., Bergamo (IT)

( * ) Notice: Subject to any disclaimer, the term of this patent is extended or adjusted under 35 U.S.C. 154(b) by 186 days.

(21) Appl. No.: 16/098,966

(22) PCT Filed: May 5, 2017

(86) PCT No.: PCT/IB2017/052617
§ 371 (c)(1),
(2) Date: Nov. 5, 2018

(87) PCT Pub. No.: WO2017/191601
PCT Pub. Date: Nov. 9, 2017

(65) Prior Publication Data
US 2019/0152463 A1    May 23, 2019

(30) Foreign Application Priority Data
May 5, 2016    (IT) .......................... 102016000046460

(51) Int. Cl.
*B60T 17/22* (2006.01)
*F16D 65/12* (2006.01)
*F16D 66/02* (2006.01)

(52) U.S. Cl.
CPC ............ *B60T 17/221* (2013.01); *F16D 65/12* (2013.01); *F16D 66/02* (2013.01); *F16D 66/027* (2013.01)

(58) Field of Classification Search
CPC .......... F16D 65/12; F16D 66/02; F16D 66/027
See application file for complete search history.

(56) References Cited

U.S. PATENT DOCUMENTS

| 4,271,393 A | 6/1981 | Hansen et al. |
| 5,028,100 A | 7/1991 | Valleau et al. |
| (Continued) | | |

FOREIGN PATENT DOCUMENTS

| DE | 202011103105 U1 | 10/2012 |
| EP | 1394360 A1 | 3/2004 |
| (Continued) | | |

OTHER PUBLICATIONS

Foerster GMBH & Co. KG, Dortmund, Germany, Eddy Current Testing for Safe Components, Apr. 30, 2011, pp. 1-31.
(Continued)

*Primary Examiner* — Clayton E. LaBalle
*Assistant Examiner* — Dennis Hancock
(74) *Attorney, Agent, or Firm* — Marshall & Melhorn, LLC

(57) ABSTRACT

A system for monitoring a brake disc of a braking system of a vehicle may have at least one source of an electromagnetic quantity having a set space-time pattern such as to interact with the brake disc in a manner dependent on the properties of the brake disc generating a respective variable signal. At least one sensor for detecting such variable signal may also be provided. The at least one detection sensor may face a set limited portion of an investigation surface of the brake disc. The set limited portion of the investigation surface being at least one set closed path that can be defined on the investigation surface of the brake disc. The detected variable signal being able to be analysed to determine at least one (Continued)

parameter of the brake disc based on a deviation of the time pattern of the detected variable signal with respect to a set reference time pattern.

20 Claims, 7 Drawing Sheets

(56) References Cited

U.S. PATENT DOCUMENTS

| | | | |
|---|---|---|---|
| 5,811,970 | A | 9/1998 | Cook et al. |
| 6,275,032 | B1 | 8/2001 | Iwata et al. |
| 6,285,183 | B1 | 9/2001 | Collingwood et al. |
| 2015/0041258 | A1* | 2/2015 | Asen .................. F16L 3/00 |
| | | | 188/1.11 L |
| 2015/0115697 | A1* | 4/2015 | Yamamoto ............ B60T 13/588 |
| | | | 303/3 |
| 2015/0292911 | A1* | 10/2015 | Slanker ................... B60T 17/18 |
| | | | 324/207.16 |
| 2019/0003542 | A1* | 1/2019 | Ramagnano ....... G01N 27/9046 |

FOREIGN PATENT DOCUMENTS

| | | |
|---|---|---|
| EP | 2182347 A2 | 5/2010 |
| GB | 2329712 A | 3/1999 |

OTHER PUBLICATIONS

European Patent Office, International Search Report with Written Opinion issued in PCT/IB2017/052617, dated Aug. 8, 2017, 11 pages, European Patent Office, Rijswijk, Netherlands.

\* cited by examiner

SYSTEM FOR MONITORING A BRAKE DISC OF A BRAKING SYSTEM OF A VEHICLE

FIELD OF THE INVENTION

The present invention relates to a system for monitoring a brake disc of a braking system of a vehicle.

BACKGROUND OF THE INVENTION

Nowadays, in order to improve the monitoring of a brake disc, in addition to measuring the wear of the brake disc itself, the need is increasingly felt to be able to monitor the presence of anomalies due to wear, e.g. deformations, which could be formed on the brake disc before the end of its working life putting at risk the reliability of the braking system of the vehicle itself, and thus the safety of the vehicle itself.

With this regard, there are monitoring systems of a brake disc of a vehicle adapted to directly detect an anomaly on the surface of a brake disc.

However, such monitoring systems require the arrangement of specific components in close proximity to the surface of the brake disc which certainly represents a limit from the point of view of the installation of such monitoring system in the braking system.

Furthermore, the very close distance to the surface of the brake disc could damage both the brake disc and the monitoring system during operation of the vehicle.

Additionally, in some cases, the measuring quality of the anomaly may be compromised in presence of dust, water and dirt in general. In yet other cases, it would not be possible to detect specific anomalies, such as cracks and fissures present on the surface of the brake disc.

SUMMARY OF THE INVENTION

It is the object of the present invention to devise and provide a system for monitoring a brake disc of a braking system of a vehicle which allows to avoid, at least partially, the drawbacks described above with reference to the prior art and which ensures a reliable and timely detection of a brake disc anomaly, also in presence of cracks or fissures.

Such an object is achieved by means of a monitoring system according to claim 1.

Preferred embodiments of such monitoring system are defined in the dependent claims.

BRIEF DESCRIPTION OF THE DRAWINGS

Further features and advantages of the system for monitoring a brake disc of a braking system of a vehicle according to the invention will be apparent in the following description which illustrates preferred embodiments, given by way of indicative, non-limiting examples, with reference to the accompanying figures, in which.

DETAILED DESCRIPTION OF THE PREFERRED EMBODIMENTS

Figure 1:
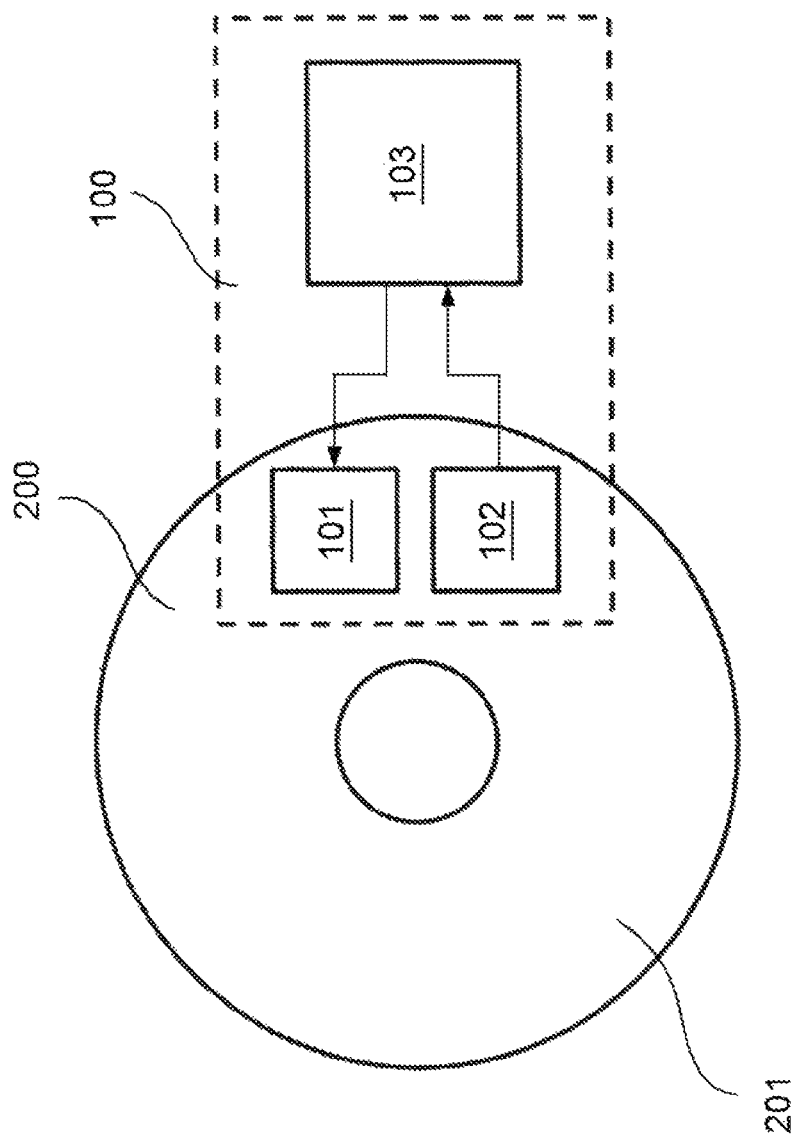
FIG. 1 diagrammatically shows a front view of a brake disc and a system for monitoring a brake disc of a braking system of a vehicle, according to an embodiment of the invention.

A system for monitoring a brake disc in a braking system of a vehicle, according to an embodiment of the present invention, will now be described with reference to FIGS. 1-2.

It is worth noting that equal or similar elements in the figures will be indicated by the same reference numerals.

The system for monitoring a brake disc of a braking system of a vehicle, hereinafter also simply monitoring system or system, is indicated as a whole in FIGS. 1 and 2 by a dashed rectangle and reference numeral 100.

Figure 2:
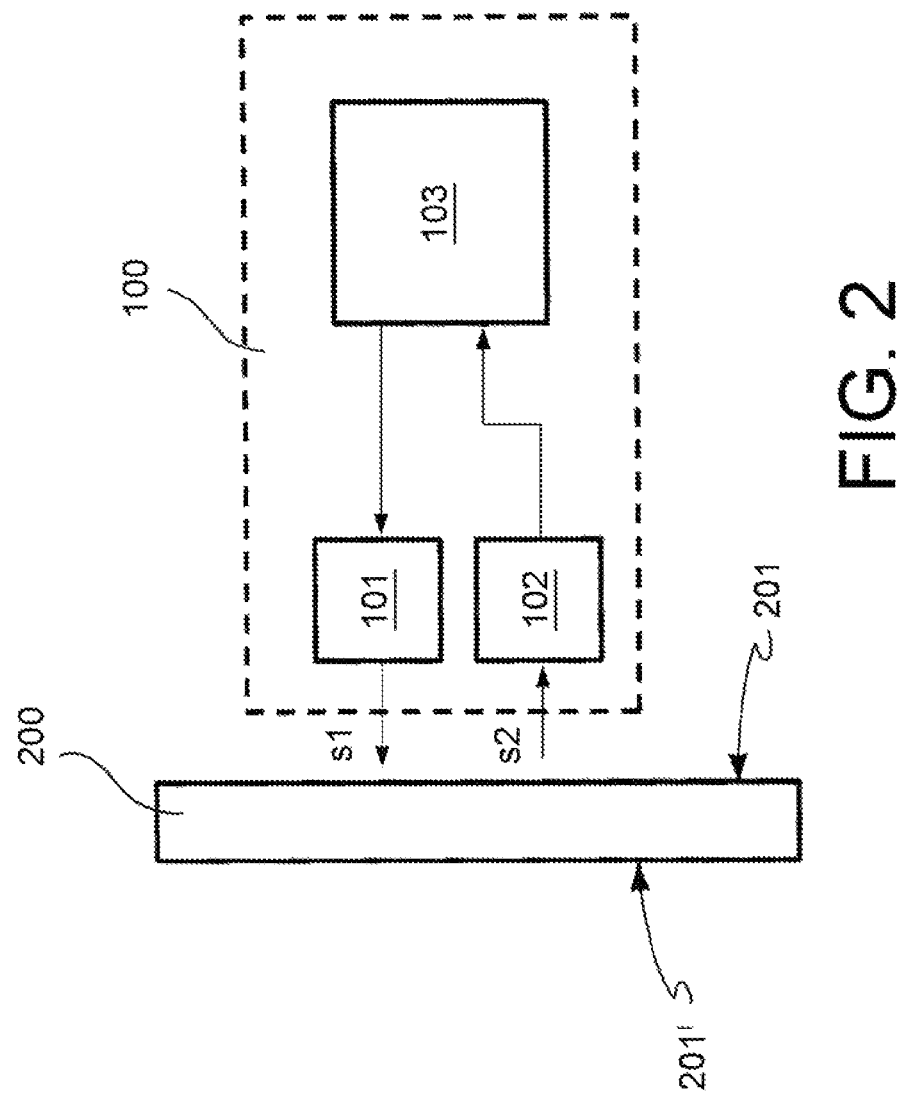
FIG. 2 diagrammatically shows a side view of a brake disc and a system for monitoring a brake disc of a braking system of a vehicle of FIG. 1.
Figure 3:
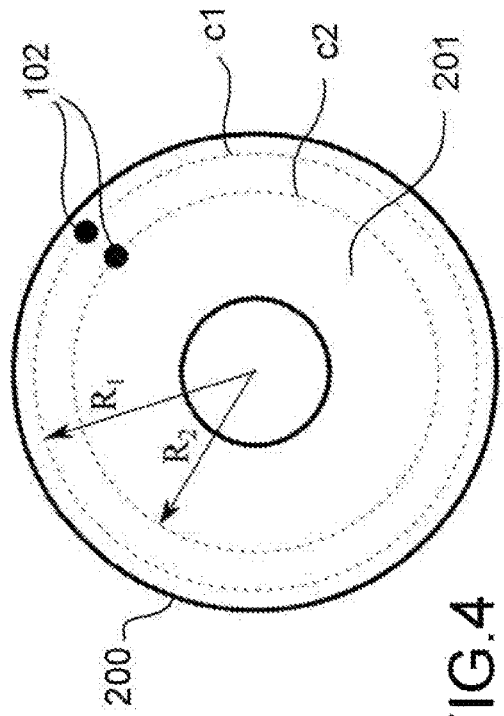
FIGS. 3, 4, 5 and 6 diagrammatically show a brake disc and one or more components of a system for monitoring a brake disc of a braking system of a vehicle, according to different embodiments of the invention.

A brake disc 200 which can be monitored by the monitoring system 100 is diagrammatically shown in FIGS. 1 and 2.

In greater detail, in FIG. 1 the brake disc 200 is shown with a front view, while a side view is shown in FIG. 2.

In an embodiment, the brake disc 200 is part of a braking system of a vehicle (not shown in the figures).

In this embodiment, the monitoring system 100 is installed in the braking system of the vehicle or in general on the vehicle itself, as will be described also hereinafter.

In this embodiment, the monitoring system 100 may be considered fixed, while the brake disc 200 is in rotation during normal use of the vehicle.

In a further embodiment, alternative to the one above, the brake disc 200, though intended for a braking system of a vehicle, may be part of a test or service bench.

In this embodiment, the monitoring system 100 is installed on the test or service bench.

In this embodiment, the brake disc 200 is fixed, while the monitoring system 100, or at least part of it, rotates with respect to the brake disc 200.

In another embodiment, alternative to the one above, although the monitoring system is installed on a test or service bench, the brake disc 200 is moving, while the monitoring system 100, or at least part of it, is fixed with respect to the brake disc 200.

In another embodiment, alternative to the one above, although the monitoring system is installed on a test or service bench, the brake disc 200 is fixed while the monitoring system 100, or at least part of it, is moving with respect to the brake disc 200, tracing a set path.

Again, with reference to the embodiment in FIGS. 1 and 2, the system 100 comprises at least one source 101 of an electromagnetic quantity.

In FIG. 2, the electromagnetic quantity is symbolically represented by an arrow facing from the source 101 towards the brake disc 200 and indicated by reference numeral s1.

The electromagnetic quantity has a set space-time pattern such as to interact with the brake disc 200 in a manner dependent on the properties of the brake disc 200, generating a respective variable signal.

In other words, the electromagnetic quantity s1 is a field defined in a space region containing the brake disc 200.

The variable signal s2 which can be generated by the interaction of the electromagnetic quantity with the brake disc 200 has a time pattern which may deviate from a set reference time pattern if an anomaly is present in the brake disc 200, e.g. a crack, a fissure, brake disc wear, brake disc deformation, and so on.

It is worth noting that the deviation of the time pattern of the variable signal s2 may occur in amplitude and/or in frequency and/or in phase.

It is worth noting that the variable signal will also be described below.

According to an embodiment, the electromagnetic quantity s1 may be an electrical field.

In such embodiment, the source 101 is an electrical field generator, e.g. a rechargeable plate, an emitter (antenna), a generator of alternating electrical current or of electrical charge.

According to a further embodiment, alternative to the one above, the electromagnetic quantity s1 may be a magnetic field.

In such embodiment, the source 101 is a magnetic field generator, e.g. a coil which can be energised, an electromagnet/magnet, a direct electrical current generator, alternating electrical current.

According to a further embodiment, alternative to the ones above, the electromagnetic quantity s1 may be an electromagnetic field.

In such embodiment, the source 101 is an electromagnetic field generator, e.g. a coil which can be energised, an electromagnet, an emitter (antenna), a direct electrical current generator, alternating electrical current.

Turning in general to the embodiment shown in FIGS. 1 and 2, the system 100 further comprises at least one sensor 102 for detecting such variable signal.

According to an embodiment, symbolically shown in FIGS. 1 and 2, the source 101 and the at least one sensor 102 are mutually distinct.

According to a further embodiment, alternative to the one described above, the source 101 and said at least one sensor 102 may coincide.

As mentioned above, the variable signal s2 can be generated as a result of the interaction of the electromagnetic quantity s1 with the brake disc 200 in a manner dependent on the properties of the brake disc 200.

It is worth noting that in an embodiment, the variable signal s2 is the electromagnetic or electric or magnetic field resulting from the interaction of the electromagnetic quantity s1 with the brake disc 200.

This can be obtained by modifying the electrical and/or magnetic quantities of the source 101 as a consequence perturbing the respective energising signal and generating an internal feedback which can be detected by current and/or voltage reading.

With this regard, in FIG. 2, the variable signal is indeed symbolically represented by an arrow facing from the brake disc 200 towards the detection sensor 102 and is indicated by reference numeral s2.

Advantageously, such at least one detection sensor 102 faces towards a set limited portion of an investigation surface 201 of the brake disc 200.

The set limited portion of the investigation surface 201 of the brake disc 200 is at least one set closed path c1 which can be defined on the investigation surface 201 of the brake disc 200.

According to an embodiment, also shown in FIGS. 3-7, the set limited portion of an investigation surface 201 is at least one circumference c1 which can be defined on the investigation surface 201 of the brake disc 200.

In this embodiment, shown in FIGS. 3-7, the at least one circumference c1 has a set first radius R1 with respect to the centre of the brake disc 200.

It is worth noting that in this embodiment, the simplest, the length of the first radius R1 is such that the detection sensor 102 is positioned at the outer part of the braking band of the brake disc 200, usually the most critical position for the formation of anomalies, such as cracks or fissures.

According to further embodiments, the set portion of the investigation surface 201 comprises one or more set closed paths.

In particular, the set portion of the investigation surface 201 comprises a further set closed path c2 definable on the investigation surface 201 of the brake disc 200 in addition to the at least one set closed path c1.

Figure 4:
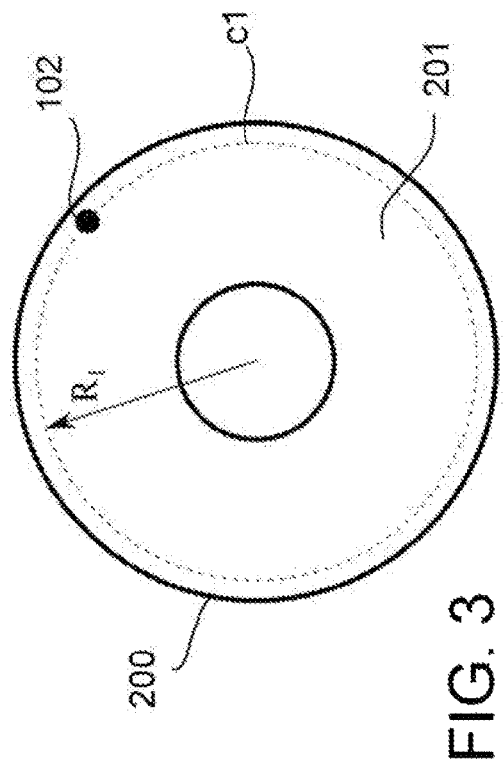
Figure 6:
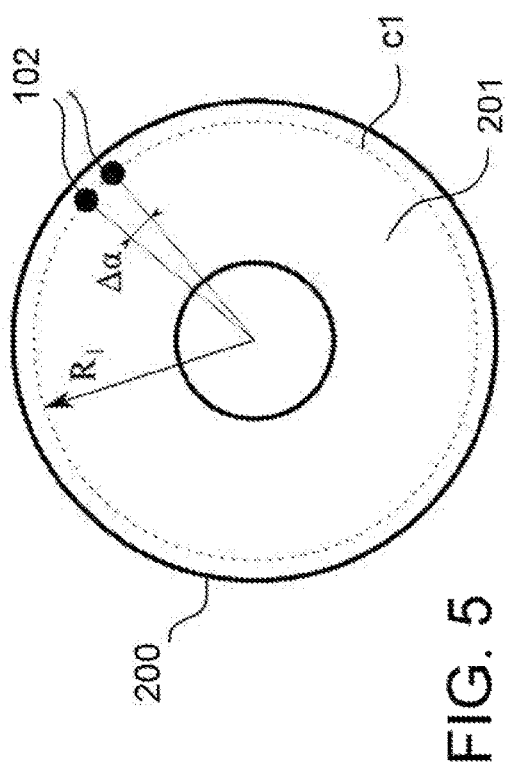
Figure 7:
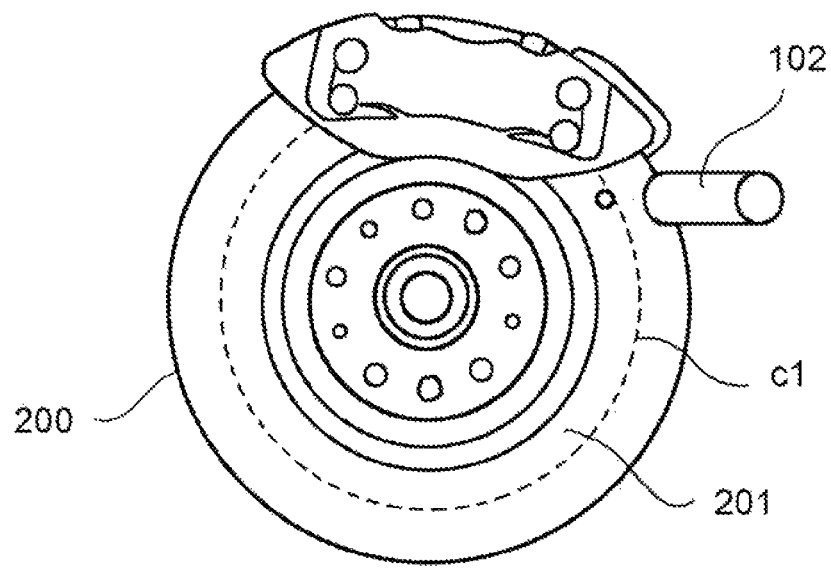
FIG. 7 diagrammatically shows a brake disc, a brake calliper for a brake disc and a component of a system for monitoring a braking system of a vehicle according to a further embodiment of the invention.

In the embodiments of the FIGS. 4 and 6, the further set closed path c2 is a further circumference c2 which can be defined on the investigation surface 201 of the brake disc 200.

The at least one circumference c1 and the further circumference c2 have set radii with respect to the centre of the brake disc.

In particular, the further circumference c2 has a set second radius R2 with respect to the centre of the brake disc 200.

In such embodiments, the length of the set second radius R2 is smaller than the set first radius R1.

It is worth noting that the fact that the set limited portion of the investigation surface 201 of the brake disc comprises multiple set closed paths (e.g. circumferences) which can be defined on the investigation surface 201 of the brake disc 200 advantageously allows to increase the limited portion of investigation, which may cover most of the braking band of the brake disc 200, consequently improving the reliability of the monitoring system 100.

With this regard, it is worth noting that the possibility of the set limited portion of the investigation surface 201 of brake disc 200 comprising at least one set closed path c1 (e.g. a circumference) or one or more further set closed paths c2 (e.g. circumferences) which can be defined on the investigation surface 201 of the brake disc 200 depends on the configuration of the detection sensor 102 used.

Figure 8:
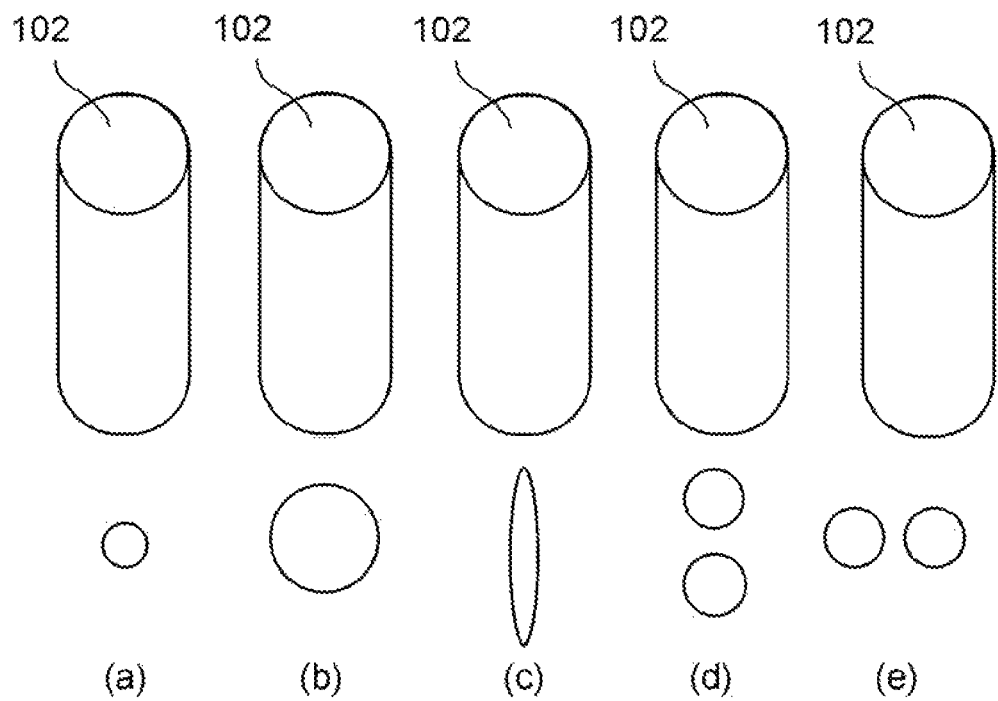
FIG. 8 diagrammatically shows a component of a system for monitoring a brake disc of a braking system of a vehicle according to different embodiments.
Figure 9A:
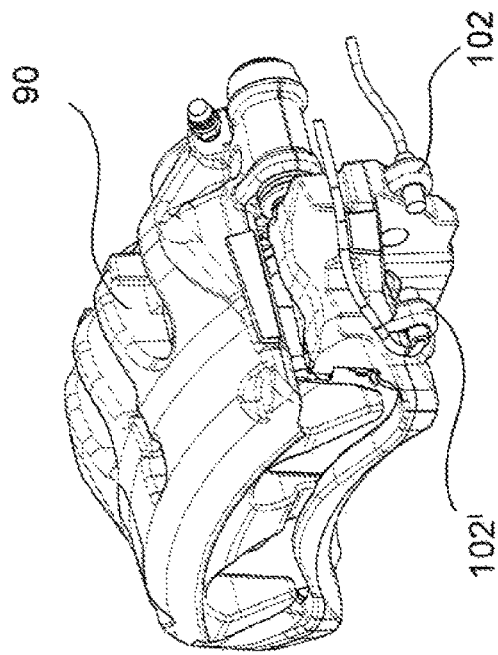
FIGS. 9a-9d show different views of an example of a calliper body for brake disc with which one or more components of a system for monitoring a braking system of a vehicle are associated according to an embodiment of the invention.
Figure 9B:
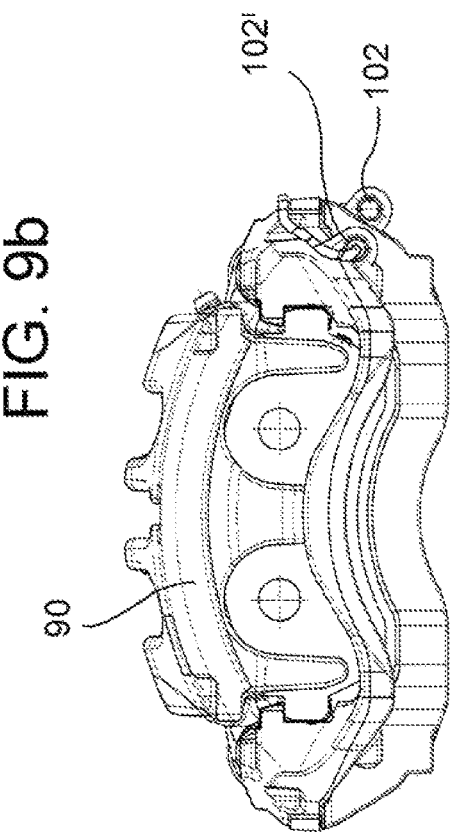
Figure 9C:
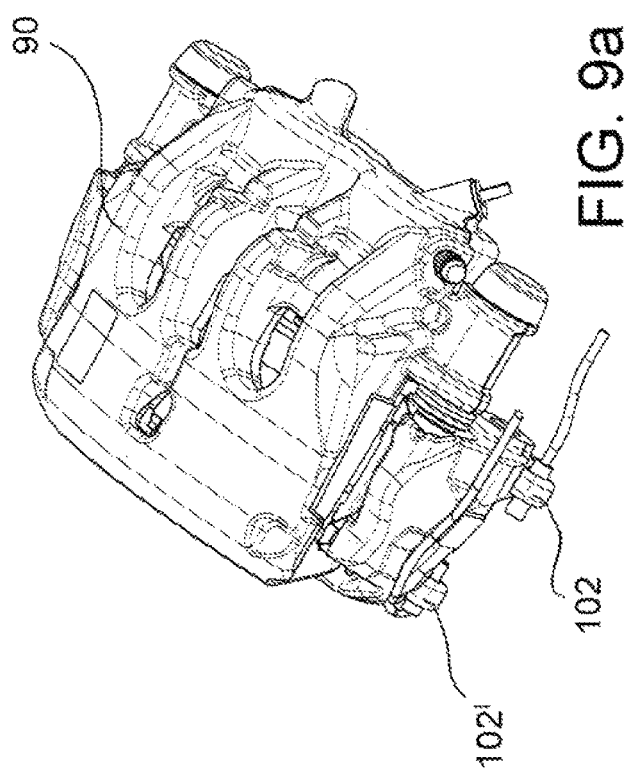
Figure 9D:
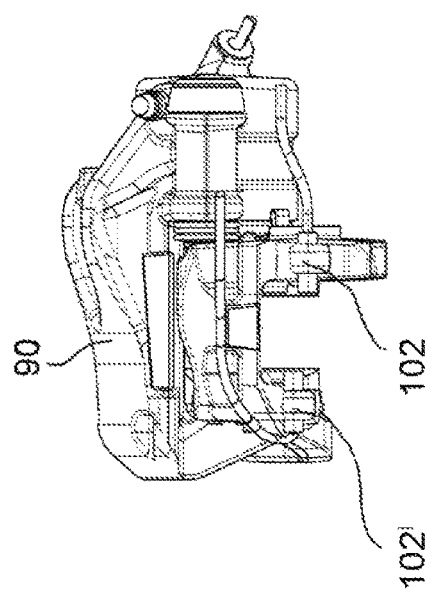

With reference also to FIG. 8, in an embodiment, the detection sensor 102 may be configured to perform a punctiform type reading (embodiment in FIG. 8 (a)). Such a configuration can be obtained by using a type of reading head with punctiform measuring area.

In a further embodiment, shown in FIG. 8(b), the detection sensor 102 may be configured to perform a diffused type reading, wherein the width of the measuring area may be increased.

According to this embodiment, the set limited portion of the investigation surface 201 of the brake disc 200 comprises at least one set closed path c1, such as a circumference or circumferential band or circular crown c1, which can be defined on the investigation surface 201 of the brake disc 200.

According to a further embodiment, shown in figure (c), the detection sensor 102 may be configured to perform a linear diffused reading. Such a configuration can be obtained by using a type of reading head with an elongated measuring area.

According to this embodiment, the set limited portion of the investigation surface 201 of the brake disc 200 comprises at least one set closed path c1, such as a circumferential band or circular crown, which can be defined on the investigation surface 201 of the brake disc 200.

According to further embodiments, shown in FIGS. 8 (d) and 8 (e), the detection sensor 102 may be configured to perform multiple and/or matrix readings.

In particular, in these embodiments, the detection sensor 102 comprises a plurality of punctiform detection points distributed in a matrix. This configuration can be obtained by using multiple reading heads with punctiform measuring area.

If the detection points are distributed on a same line along the radial direction of the investigation surface 201 of the brake disc 200, as shown in FIG. 8 (d) and in the embodiment of FIG. 4, the set limited portion of the investigation surface 201 of the brake disc 200 comprises, as set closed paths, the at least one circumference c1 and the further circumference c2 which can be defined on the investigation surface 201 of the brake disc 200.

Figure 5:
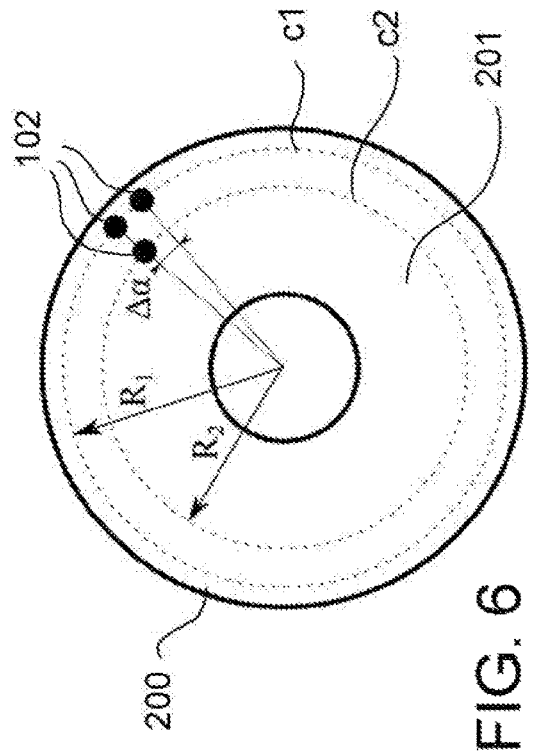

If the detection points are distributed on a same line transversally to the radial direction of the investigation surface 201 of the brake disc 200, as shown in FIG. 8 (e) and in the embodiment of FIG. 5, the set limited portion of the investigation surface 201 of the brake disc 200 comprises, as set closed path, only at least one circumference c1 which can be defined on the investigation surface 201 of the brake disc.

According to a further embodiment, shown in FIG. 6, the detection points of the sensor 102 may also be distributed in the radial direction and transversally to the radial direction of the investigation surface 201 of the brake disc 200.

In the case of FIG. 6, the set limited portion of the investigation surface 201 of the brake disc 200 comprises the at least one set closed path c1 (e.g. a circumference c1) and the further set closed path c2 (e.g. a further circumference c2) which can be defined on the investigation surface 201 of the brake disc 200 and two detection points of the detection sensor 102 are present on one of the two (the at least one circumference c1 in FIG. 6).

It is worth noting that in order to be able to monitor most of the braking band of the brake disc 200, alternatively to the use of a detection sensor 102 provided with a plurality of detection points distributed in the radial direction of the investigation surface 201 of the brake disc, in a further embodiment, the detection sensor 102 may be configured to translate, e.g. by means of an actuating device (not shown in the figures) with which the system 100 may be provided, along the radial direction of the investigation surface 201 of the brake disc 200.

In this embodiment, the set limited portion of the investigation surface 201 of the brake disc 200 comprises a closed set path, the distance of which from the centre of the brake disc 200 is variable during the relative rotation between the brake disc 200 and the monitoring system 100.

According to a further embodiment, in combination with any one of those described above, the system 100 may comprise a position sensor operatively coupled to said at least one detection sensor 102 in order to obtain more reliable measurements.

It is worth noting that the presence of one or more detection sensors or of one or more detection points (within the same sensor) advantageously allows to improve and increase the quantity of available information. The redundancy of such information allows to examine different positions in which the anomalies appear (cracks or fissures).

With reference again to the embodiments in FIGS. 4, 5 and 6, it is worth noting that the presence of one or more detection points distributed on multiple circumferences or anyway on multiple closed paths with different radii of the investigation surface 201 of the brake disc allows to monitor most of the braking band.

Instead, the presence of multiple detection points on the circumference or closed path of the investigation surface 201 of the brake disc 200 itself allows to improve the robustness of the detections and possibly to be able to perform differential calculations on other quantities which can be monitored on the brake disc 200, such as for example the immediate calculation of the rotation speed or the different calculation of the brake disc wear.

With this regard, it is worth noting that the embodiments described hereto make reference to the presence of at least one detection sensor 102 in which one or more detection points (detection heads) are envisaged, distributed according to any one of the configurations described above.

Alternatively or in combination with this embodiment, similar distributions could be obtained using a plurality of sensors, entirely similar to sensor 102 described above, each of which is provided with a detection point or, in turn, with one or more detection points according to any one of the configurations described above.

Furthermore, alternatively or in combination with the embodiments described above, the system 100, according to an embodiment, may comprise at least one detection sensor facing towards the set limited portion of the investigation surface 201 of the brake disc 200, as the detection sensor 102 described above, and at least one further detection sensor 102' (not shown for example in the figures) facing towards a set limited portion of a further investigation surface 201' of the brake disc, opposite to the investigation surface 201 (FIG. 2).

The at least one further detection sensor 102' may be made according to the different embodiments described above with reference to said at least one detection sensor 102, thus not repeated here.

According to a further embodiment, the at least one sensor 102 may be an integral part of a test or service bench using fixed or portable equipment, pen with sensor integrated inside.

According to further embodiments, it is worth noting that the investigation surface of the brake disc 200 could be the outer surface of the brake disc or the fixing bell of the brake disc 200 (both not shown in figures).

Turning now in general to the monitoring system 100 in FIGS. 1 and 2, it is worth noting that the variable signal s2 can be advantageously analysed to determine at least one parameter of the brake disc 200 on the basis of a deviation of the time pattern of the variable signal detected by the at least one detection sensor 102 with respect to a set reference time pattern.

According to an embodiment, the parameter of the brake disc 200 is representative of an anomaly of the brake disc 200.

Turning back to the variable signal s2, according to an embodiment, it is an electric field either reflected or modified by the interaction of the electromagnetic quantity s1 with the brake disc 200.

In this embodiment, the electromagnetic quantity s1 which can be generated by the source 101 is an electrical field.

According to a further embodiment, alternative to the one above, the variable signal s2 is a magnetic field flux either reflected or modified by the interaction of the electromagnetic quantity s1 with the brake disc 200.

In this embodiment, the electromagnetic quantity s1 which can be generated by the source 101 is a magnetic field.

According to a further embodiment, alternative to the ones above, the variable signal s2 is an electromagnetic quantity either reflected or modified by the interaction of the electromagnetic quantity s1 with the brake disc 200.

In this embodiment, the electromagnetic quantity s1 which can be generated by the source 101 is an electromagnetic field.

According to a further embodiment, alternative to the ones above, the variable signal s2 is an eddy electric current generated by the brake disc 200 following the interaction with the brake disc 200 of the electromagnetic quantity s1 which can be generated by the source 101. In this embodiment, the electromagnetic quantity s1 is a variable external magnetic field (alternating electrical current).

The technology of the detection sensor 102 which can be used depends on the type of variable signal generated by the brake disc, thus the type of source 101 of electromagnetic quantity used in the monitoring system 100, both if the source 101 and the at least one sensor 102 are mutually distant and if the source 101 and the at least one sensor 102 coincide.

Turning back to the embodiment in FIGS. 1 and 2, the system 100 further comprises a data processing unit 103 operatively connected to the detection sensor 102.

In an embodiment, the data processing unit 103 is operatively connected to the detection sensor 102 by wire.

In an embodiment alternative to the one above, the data processing unit 103 is operatively connected to the detection sensor 102 in wireless mode.

The data processing unit 103 is advantageously configured to analyse the detected variable signal s2 and to determine at least one parameter of the brake disc 200 on the basis of a deviation of the time pattern of the variable signal s2 detected with respect to the set reference time pattern of the variable signal s2.

It is worth noting that the deviation of the time pattern of the variable signal s2 may occur in frequency and/or in amplitude and/or in phase.

It is also worth noting that the parameter of the brake disc 200 is representative of an anomaly of the brake disc 200.

In greater detail, the data processing unit 103 is configured to generate the electromagnetic quantity s1 by actuating the generator 101 of the electromagnetic quantity s1. With this regard, the data processing unit 103 is operatively connected, e.g. by means of a wire or in wireless mode, to the generator 101.

The data processing unit 103 is further configured to receive the variable signal s2 detected by the detection sensor 102.

The data processing unit 103 is further configured to filter the variable signal s2 detected by the detection sensor 102 by using a set filtering method.

Examples of reliable filtering methods which can be used by the data processing unit 103 are filtering with wavelet transform, filtering with Fast Fourier Transform FFT or band-pass filtering (e.g. with a Butterworth filter, a Bessel filter and so on), either digital or analogue.

The data processing unit 103 is further configured to compare the detected and filtered variable signal s2 with at least one reference threshold value.

The data processing unit 103 is further configured to provide information representative of the presence of a parameter of the brake disc 200 on the basis of the comparison of the detected variable signal s2 filtered with said at least one reference threshold value.

In particular, if the detected and filtered variable signal s2 is over the reference threshold value, the data processing unit 103 is configured to provide said information representative of the presence of an anomaly of the brake disc 200.

If instead the detected and filtered variable signal s2 is under the reference threshold value, the data processing unit 103 is configured to not provide said information representative of the presence of an anomaly of the brake disc 200.

It is worth noting that the variable signal s2 detected by the detection sensor 102 allows to provide information representative of the presence of a so-called direct anomaly of the brake disc 200, i.e. a crack, a fissure, wear or a deformation of the brake disc 200.

According to a further embodiment, the data processing unit 103 is configured to determine first information representative of the use of the brake disc 200 on the basis of the variable signal s2 detected by the sensor 102.

Such first information representative of the use of the brake disc 200 comprises structural or functional parameters of the brake disc 200, such as rotation speed, braking intensity, residual torque, locked brake disc condition, temperature, presence of water, presence of rust, consumption of material of a carbon-based brake disc (carbon-ceramic, CCM, carbo-carco, CC), and so-on.

In the case of speed, the data processing unit 103 is configured to determine the rotation speed of the brake disc 200 either on the basis of the periodicity of the detected variable signal s2 or on the basis of the time difference between variable signals detected by two different detection points (if present) of the sensor 102 or by two different detection sensors placed on the same circumference c1 which can be defined on the investigation surface of the brake disc 200.

According to a further embodiment, the data processing unit 103 is configured to determine second information representative of the use of the brake disc 200 on the basis of the first information representative of the use of the brake disc 200.

The second information representative of the use of the brake disc 200 comprise structural or functional parameters of the brake disc or of the vehicle in general, i.e. information which is more complicated to be determined with respect to the first information representative of the use of the brake disc 200, such as for example an assessment of the vehicle grip on the road, the friction between brake disc and brake pad, and so on.

Turning now back in general to the monitoring system 100 of the FIGS. 1 and 2, according to an embodiment, the data processing unit 103 is an electronic control unit integrated in the braking system of the vehicle.

According to a further embodiment, the data processing unit 103 is a main electronic control unit of the vehicle.

In such a case, the main electronic control unit of the vehicle is configured with specific program codes the running of which allows to perform the operations described above with reference to the data processing unit 103.

According to a further embodiment, the data processing unit 103 is an electronic test or service bench.

Also in this case, the electronic processor of the test or service bench is configured with specific program codes the running of which allows to perform the operations described above with reference to the main electronic data processing unit 103 of the vehicle.

Some possible arrangements of said at least one sensor 102 of the monitoring system 100 when integrated in a braking system of a vehicle are described with reference now also to FIGS. 9*a*-9*d*, 10*a*-10*c* and 11*a*-11*c*.

In an embodiment (FIGS. 9*a*-9*d*), said at least one detection sensor 102 may be housed in a respective housing defined in a bracket of a floating body 90 for brake disc.

It is worth noting that in the embodiment of FIGS. 9*a*-9*d* the monitoring system 100 further comprises at least one detection sensor 102'.

The at least one detection sensor 102 and the at least one further detection sensor 102' are arranged so as to face towards a respective investigation surface of the brake disc (not shown in FIGS. 9*a*-9*d*).

In a further embodiment (FIGS. 10*a*-10*c*), said at least one detection sensor 102 may be housed in a respective housing defined in a fixed calliper body 91 for brake disc.

Figure 10B:
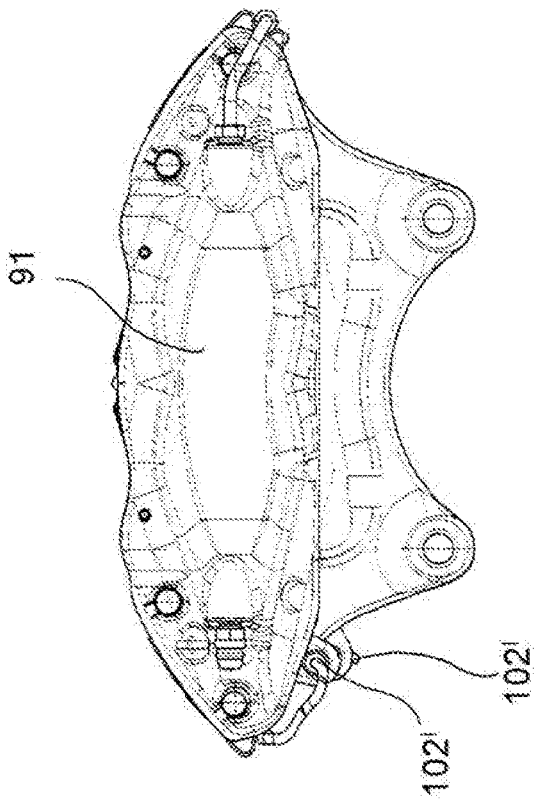
FIGS. 10a-10c show different views of a further example of a calliper body for brake disc with which one or more components of a system for monitoring a braking system of a vehicle are associated according to a further embodiment of the invention.
Figure 10C:
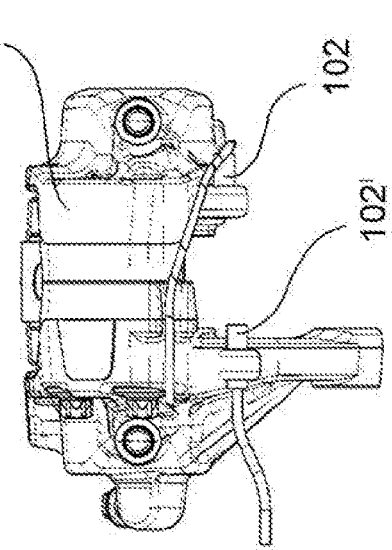
Figure 10A:
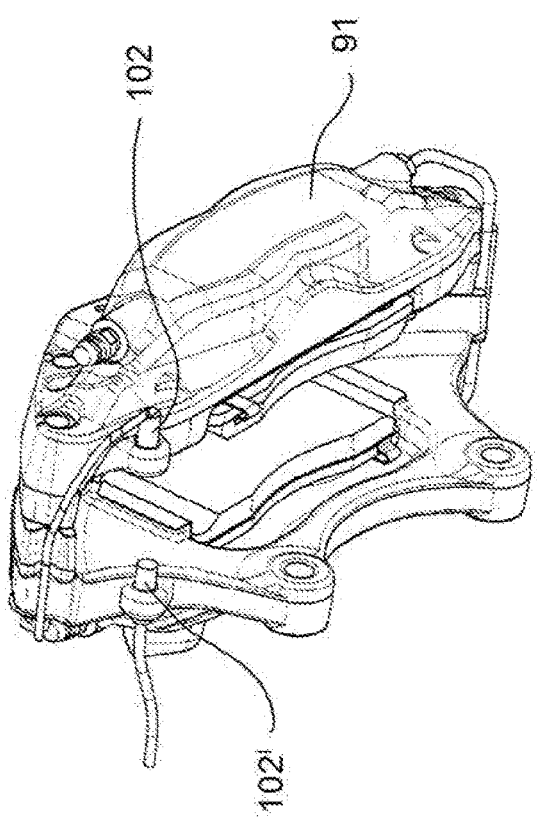

It is worth noting that in the embodiment of FIGS. 10*a*-10*c* the monitoring system 100 further comprises at least one detection sensor 102'.

The at least one detection sensor 102 and the at least one further detection sensor 102' are arranged so as to face towards a respective investigation surface of the brake disc (not shown in FIGS. 10*a*-10*c*).

In a further embodiment (FIGS. 11*a*-11*c*), said at least one detection sensor 102 may be housed in a respective housing defined in a floating calliper body 92 for brake disc.

Figure 11A:
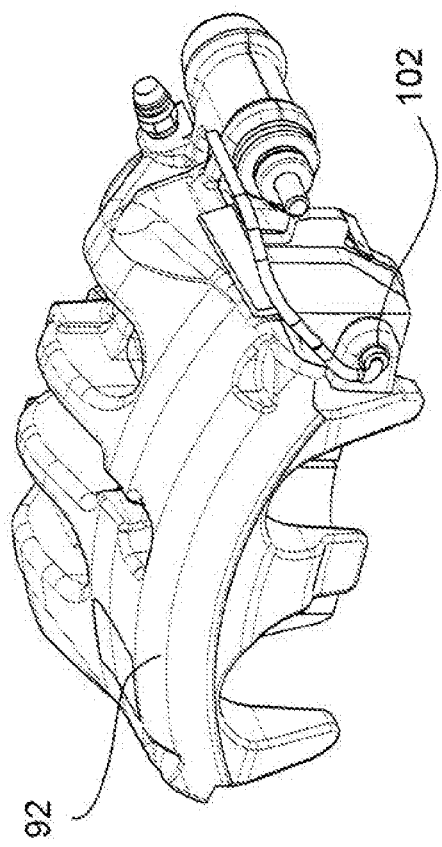
FIGS. 11a-11c show different views of a further example of a calliper body for brake disc with which one or more components of a monitoring system of a braking system of a vehicle are associated according to a further embodiment of the invention.
Figure 11C:
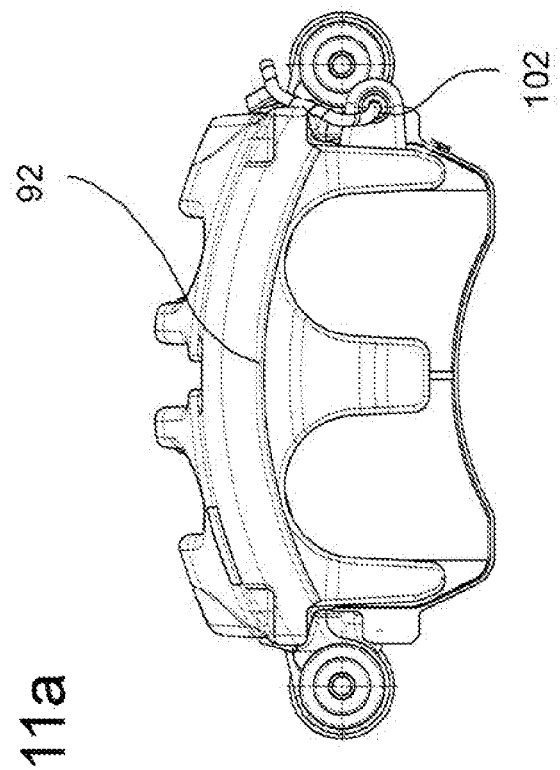
Figure 11B:
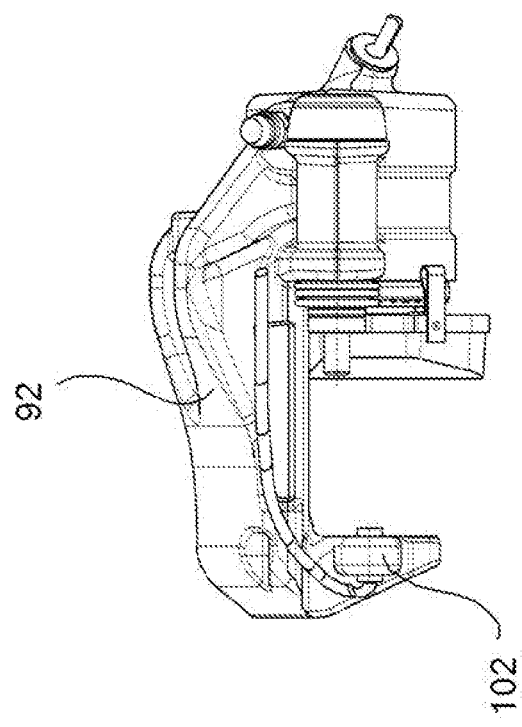

The at least one detection sensor 102 is arranged so as to be towards a respective investigation surface of the brake disc (not shown in FIGS. 11*a*-11*c*).

According to further embodiments, not shown in the figures and alternative to the ones described above, the at least one detection sensor 102 may be installed on non-rotating components of the vehicle near the brake disc, such as, for example, a stub axle, a suspension of a chassis of the vehicle.

As apparent, the object of the invention is achieved because the suggested monitoring system has many advantages.

Firstly, a brake disc can be monitored by determining a parameter of the brake disc and consequently the presence of cracks or fissures and other information representative of the use of the brake disc, thus of the braking system in general, by means of detection sensors which exploit the eddy currents and/or the magnetic field and/or the electrical field.

This allows to obtain contactless detections of anomalies, also allowing a multiple detection of different quantities which may contribute to the determination of different information.

Furthermore, the detection may be performed instantaneously and the position of the anomaly (crack) may be identified in addition to its presence.

Furthermore, the sensors which can be used are simple, cost-effective and easy to integrate.

The processing algorithms (filtering, comparing, and so on) of the information are simple and do not require high calculation resources, the technology and the reading are robust with respect to difficult environmental conditions, such as temperature, humidity, dirt, water and so on.

The detection sensor is compact and may be easily integrated.

It is worth noting that the monitoring system of braking system of a vehicle may be used to monitor other components of the braking system, either additionally or alternatively to the brake disc, such as callipers or pads, or to monitor other vehicle components, such as stub axle, chassis, suspension, bearing and so on.

A person skilled in art may make changes and adaptations to the embodiments of the aforesaid system for monitoring a brake disc of a braking system of a vehicle or can replace elements with others which are functionally equivalent to satisfy contingent needs without departing from the scope of protection of the appended claims. Each of the features described above as belonging to one possible embodiment may be implemented independently from the other described embodiments.

The invention claimed is:

1. A system for monitoring a brake disc of a braking system of a vehicle, comprising:
   at least one source of an electromagnetic quantity having a set space-time pattern such as to interact with the brake disc in a manner dependent on the properties of the brake disc, generating a respective variable signal;
   at least one sensor for detecting such variable signal, said at least one detection sensor facing a set limited portion of an investigation surface of the brake disc, said set limited portion of the investigation surface being at least one set closed path that can be defined on the investigation surface of the brake disc;
   the detected variable signal being able to be analysed to determine at least one parameter of the brake disc based on a deviation of the time pattern of the detected variable signal with respect to a set reference time pattern,
   wherein the deviation of the time pattern is related to an anomaly in the brake disc, where the anomaly is,
   wherein said deviation of the time pattern of the variable signal occurs in amplitude and/or in frequency and/or in phase.

2. The system according to claim 1, wherein the electromagnetic quantity is a field defined in a space region containing the brake disc.

3. The system according to claim 1, wherein the electromagnetic quantity is at least one of: an electric field, a magnetic field, an electromagnetic field, or a variable external electric field.

4. The system according to claim 1, wherein the variable signal is an electromagnetic or an electric or a magnetic field resulting from the interaction of the electromagnetic quantity with the brake disc.

5. The system according to claim 1, wherein the detected variable signal is at least one of: an eddy electric current generated by the brake disc, or an electric field reflected or modified by the interaction of the electromagnetic quantity with the brake disc, or a magnetic flow reflected or modified by the interaction of the electromagnetic quantity with the brake disc, or an electromagnetic field reflected or modified by the interaction of the electromagnetic quantity with the brake disc.

6. The system according to claim 1, wherein the set limited portion of the investigation surface of the brake disc comprises a further set closed path that can be defined on the investigation surface of the brake disc.

7. The system according to claim 1, wherein the detection sensor is configured to perform a reading of a punctual type, or of a diffused type, or a reading of a linear diffused type or a reading of a matrix diffused type, said at least one detection sensor being provided inside with one or more detection points distributed according to any one of such configurations.

8. The system according to claim 1, comprising a plurality of detection sensors, each of which is provided with a detection point or with one or more detection points.

9. The system according to claim 1, further comprising at least one further detection sensor facing a set limited portion of a further investigation surface of the brake disc, opposite the investigation surface.

10. The system according to claim 1, further comprising a data processing unit operatively connected to said at least one detection sensor, the data processing unit being configured to analyse the detected variable signal and to determine at least one parameter of the brake disc based on a deviation of the time pattern of the variable signal with respect to the set reference time pattern of the variable signal.

11. The system according to claim 10, wherein the data processing unit is configured to:
   generate the electromagnetic quantity by actuating the generator of the electromagnetic quantity;
   receive the variable signal detected by the detection sensor;
   filter the variable signal detected by said at least one detection sensor by using a set filtering method of a wavelet transform filtering, a fast Fourier transform FFT filtering or a band-pass filtering type;
   compare the variable signal detected and filtered with at least one reference threshold value;
   provide information representative of a parameter of the brake disc based on the comparison of the variable signal detected and filtered with said at least one reference threshold value.

12. The system according to claim 11, wherein the data processing unit is configured to determine first information representative of the use of the brake disc based on the variable signal detected by the sensor, or the speed of rotation, or the intensity of braking, or the residual torque, or the condition of blocked brake disc, or the temperature, or the presence of water, or the presence of rust.

13. The system according to claim 12, wherein the data processing unit is configured to determine second information representative of the use of the brake disc based on the first information representative of the use of the brake disc, that is at least evaluation of the vehicle grip on the road, friction between brake disc and brake pad.

14. The system according to claim 11, wherein no other detected or filtered signals are used during the comparison with the reference threshold value.

15. The system according to claim 11, wherein no other transformation of signal or calculations on the variable signal are needed to determine the at least one parameter.

16. The system according to claim 11, wherein said variable signal is a single signal only, said variable signal is a direct, unmodified signal.

17. The system according to claim 11, wherein said variable signal is an initial and only signal used during the comparison with the reference threshold value.

18. The system according to claim 10, wherein the data processing unit is an electronic control unit integrated inside the brake system of the vehicle or a main electronic control unit of the vehicle or an electronic processor of a test or assistance bench.

19. The system according to claim 1, wherein said at least one detection sensor is housed inside a respective housing defined in a bracket of a floating calliper body for brake disc, a respective housing defined in a fixed calliper body for brake disc or a respective housing defined in a floating calliper body for brake disc.

20. A system for monitoring a brake disc of a braking system of a vehicle, comprising:
   at least one source of an electromagnetic quantity having a set space-time pattern such as to interact with the brake disc in a manner dependent on the properties of the brake disc;
   a variable signal reflected off said brake disc dependent on the properties of the brake disc;
   at least one sensor for detecting said variable signal, said at least one detection sensor facing a set limited portion of an investigation surface of the brake disc, said set limited portion of the investigation surface being at least one set closed path that can be defined on the investigation surface of the brake disc;
   the detected variable signal is instantaneously analysed to determine the presence of a crack in the brake disc and the location of the crack in the brake disc based on a deviation of the time pattern of the detected variable signal with respect to a set reference time pattern.

* * * * *